United States Patent
Costahaude et al.

(10) Patent No.: US 6,662,714 B1
(45) Date of Patent: Dec. 16, 2003

(54) PLIANT PRESS FOR DRAINING LIQUIDS FROM CANNED FOODS

(76) Inventors: Mark Arnost Costahaude, 35061 Sierra View Rd., Agua Dulce, CA (US) 91390; Patricia Marie Costahaude, 35061 Sierra View Rd., Agua Dulce, CA (US) 91390; Dalton Winfield Costahaude, 35061 Sierra View Rd., Agua Dulce, CA (US) 91390

( * ) Notice: Subject to any disclaimer, the term of this patent is extended or adjusted under 35 U.S.C. 154(b) by 0 days.

(21) Appl. No.: 10/171,786

(22) Filed: Jun. 17, 2002

(51) Int. Cl.⁷ .................................................. B30B 9/22
(52) U.S. Cl. ........................ 100/116; 100/211; 100/213; D7/665
(58) Field of Search ............................... 100/110, 116, 100/104, 126, 269.04, 125, 211, 213; D7/665, 667, 668

(56) References Cited

U.S. PATENT DOCUMENTS

| | | | | |
|---|---|---|---|---|
| 3,392,845 A | * | 7/1968 | Shapiro et al. ............. | 210/470 |
| 3,995,544 A | * | 12/1976 | Farley ........................ | 100/116 |
| 5,272,969 A | * | 12/1993 | McDonald .................. | 100/110 |
| 5,295,432 A | * | 3/1994 | Keville et al. .............. | 100/110 |
| 5,372,063 A | * | 12/1994 | Berg ........................... | 100/110 |
| 5,590,590 A | * | 1/1997 | Zammit ....................... | 99/495 |
| 6,092,460 A | * | 7/2000 | Engelhardt .................. | 99/495 |
| 6,227,104 B1 | * | 5/2001 | Watkins, Jr. ................ | 100/110 |

* cited by examiner

Primary Examiner—Allen Ostrager
Assistant Examiner—Shelley Self

(57) ABSTRACT

The flexible press fits onto: the rim of standard sized cans for the purpose of compressing the contents of canned food and forcibly evacuating liquids from the solid food. The device comprises; a flexible center section, an oblique band molded such that it is held in place by a friction fit on the outer edge of the can; and an opening radially-located on the flexible center section of the device, designed so that when the device is affixed onto a can and the center section is then depressed against the can's severed lid, the liquid is forced out of the can in a controlled manner and discriminately directed thru the opening in the device without contact to the user's body or clothing. As the press is removed, the compressed suction cup draws the severed lid away from the solid food and removes it from the can.

6 Claims, 2 Drawing Sheets

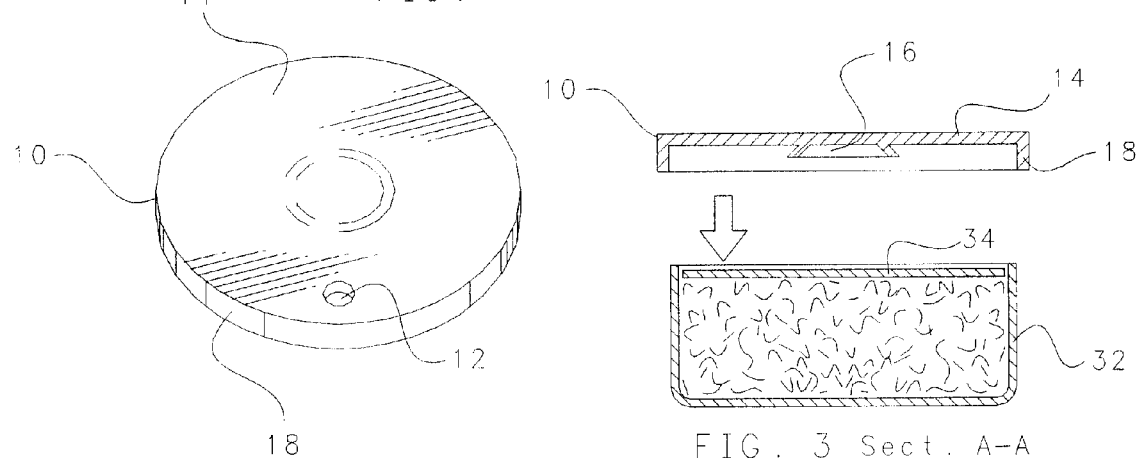
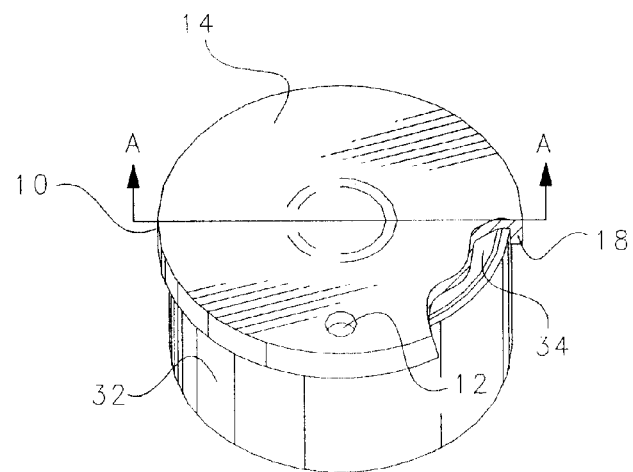
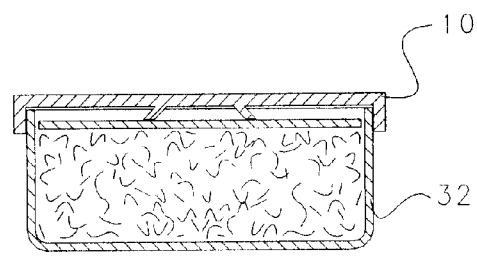
FIG. 1
FIG. 3 Sect. A-A
FIG. 2
FIG. 4 Sect. A-A

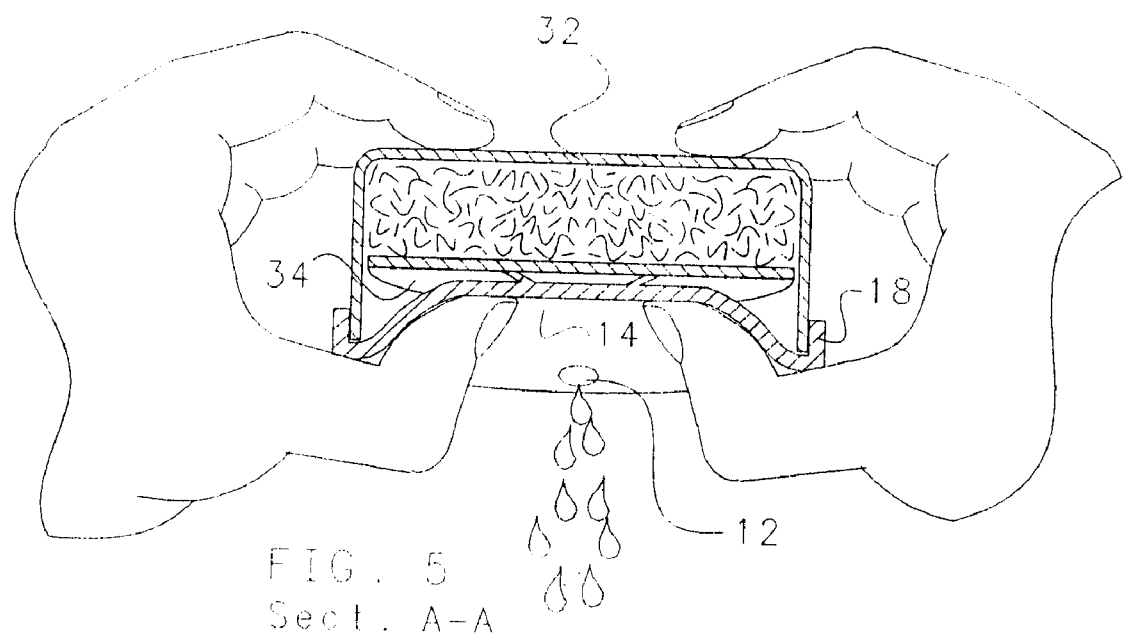
FIG. 5 Sect. A-A
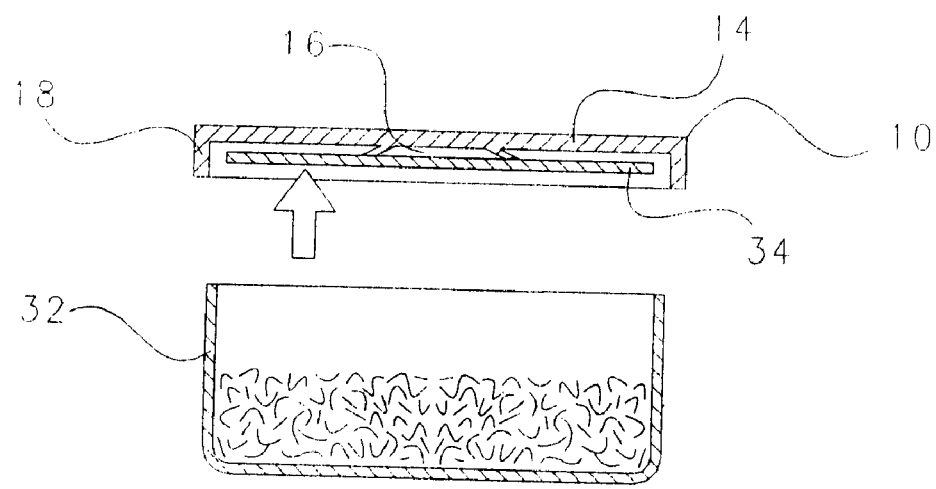
FIG. 6 Sect. A-A

PLIANT PRESS FOR DRAINING LIQUIDS FROM CANNED FOODS

CROSS-REFERENCE TO RELATED APPLICATIONS

| Current U.S. Class: | 100/110;99/506;100/213;100/295;294/65.5; D7/665;D30/130 |
|---|---|
| Intern'l Class: | B30B 009/02 |
| Field of Search: | 100/110,104,116,213,248,295,910 99/495,506 294/65.5 D7/369,665,668,669 |

References Cited [Referenced By]

U.S. Patent Documents

| D105367 | July 1937 | Swordling | D7/47. |
|---|---|---|---|
| D337702 | July 1993 | Lange | D7/665. |
| D361697 | August 1995 | McNaughton | 100/110. |
| 34241 | January 1862 | Codding | 100/116. |
| 614374 | November 1898 | Easley | 99/506. |
| 1107989 | August 1914 | Oestreich. | |
| 1027251 | May, 1912 | Hill | 100/910. |
| 1596148 | August 1926 | Bristol | 99/506. |
| 2024917 | December 1935 | Franze | 99/506. |
| 2848006 | August 1958 | Simpson | 294/65. |
| 2947563 | August 1960 | Stiff | 294/65. |
| 3040897 | June 1962 | Holman | 210/464. |
| 3380592 | April 1968 | Arnold | 210/224. |
| 3392845 | July 1968 | Shapiro et al. | 210/470. |
| 3995544 | December 1976 | Farley | 100/116. |
| 4185261 | January 1980 | Nagata | 294/65. |
| 4355574 | October 1982 | Bond et al. | 100/234. |
| 4860647 | August 1989 | Kerslake | 100/110. |
| 5148951 | September 1992 | Moure et al. | 222/116. |
| 5320031 | June 1994 | Whitney | 99/495. |
| 5372063 | December 1994 | Berg | 100/110. |
| 6,068,870 | May 2000 | Strauss | 100/110. |

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

There is a need for an improved press device for compressing and evacuating liquids away from canned tuna without getting the liquids on ones body or clothes. The present invention relates to an improvement to a press device for forcibly evacuating liquid from canned tuna and the like. Although it can be used for any number of foods, its most preferred use is with the 6 oz and 12 oz cans of tuna.

When canned tuna is opened, it is common practice to partially or fully drain off the packing fluid before eating the tuna& Most people squeeze out the liquid by first opening the can and then pushing the severed lid down in the can with their fingers or thumbs while holding the can upside down. This procedure exerts forces on the lid primarily at the two finger engaging points and forces the liquid out between the severed lid and inside of the can causing the odorous staining liquid to squirt on the user and user's clothes. The direct pressing of the severed lid with exposed fingers can also cause injury to the user. Furthermore getting the lid out of the can after pressing is time consuming and can result in injury. Prior art, which tried to solve these problems, include U.S. Pat. No. 3,995,544 issued December 1976 to Farley, which suggests a cup-like utensil having a cylindrical wall conforming to the internal diameter of a standard can for squeezing and straining tuna; U.S. Pat. No. 5,372,063 issued December 1994 to Berg, which claims a press with a body member comprising: imperforate wall, a lid engaging surface for maintaining the lid in a flat plane at right angles to the axis of the can during the pressing operation, and telescoping movement of the device relative to a can; U.S. Pat. No. 5,706,721 issued January 1998 to Holmes, which suggests a perforated disc sized to fit snugly inside an open can; U.S. Pat. No. 5,902,481 issued May 1999 to Schwietert, which suggests a molded plastic strainer device sized to fit into an open can of tuna; U.S. Pat. No. 6,068,870 issued May 2000 to Strauss, which suggests a plate matching the inner contour of a container. The prior art referenced does not successfully address the need for a cost-effective press device that prevents canned liquids from coming into contact with the user's body or clothes during pressing.

BRIEF SUMMARY OF THE INVENTION

According to the present invention we provide a flexible press for draining liquid from canned food which is somewhat the reverse of that shown by Farley, Berg, Holms, Schwietert, and Strauss but not precisely so. Some of the prior art describes a device that fits inside the can and performs the pressing function from that interior position. Berg's device claims a body with an imperforate wall. This is opposite of our design as the central body section of our device is perorated with a through hole. Also, Berg claims an unfixed device in relation to a can, whereby the can and device make equal and opposite movements telescoping and reverse telescoping. Again this is opposite to our design as the outer retaining band of our press is sized to encompass the outside of the tuna can and holds the press in place by a friction fit. Further, our design does not claim to incorporate the ability to maintain the lid in a flat plane at a right angle to the axis of the can during pressing as suggested by Berg. It is obvious to any person having ordinary skill in said subject matter that the telescoping movement of Berg's device in relation to the can, and it's ability to maintain the lid in a it plane at right angles to the axis of the can, require that the device be made of non-flexile material. If the device was made from flexible material it would bend and fold making it impossible to maintain the lid in a flat plane at right angles to the axis of the can. Importantly the positioning of the pressing device of the present invention so that it encompasses the outside edge of the can with a friction fit provides for the liquid being contained within the pressing device and the user having complete control while the liquid is channeled out the through hole opening thereby eliminating the possibility of the canned liquid coming into contact with the user's body or clothes. Once more this is opposite of Berg, as Berg's device does not contain, channel, or control the liquid; instead it allows an undesirable, uncontrollable flow of liquid out between the can and the imperforate wall.

Another object of the invention is to provide a press of the type described that accomplishes the pressing operation with the severed lid remaining in the can, the lid forming a part of the pressing structure.

Another object of the invention is to provide a press of the type described that utilizes a suction cup as a part of the press to retrieve the severed lid after the pressing operation is completed.

Other objects are to provide a press of the type described that eliminates contact of the contents of the can with the fingers or the hands to prevent the odorous material from getting on the person's hands and/or clothing and that reduces to a minimum the possibility of injury to the user.

BRIEF DESCRIPTION OF THE SEVERAL VIEWS OF THE DRAWING

FIG. 1 is an isometric view of the invention with the top facing upwardly;

FIG. 2 is an isometric view of the device of FIG. 1 showing the press in an initial step on a can before pressing;

FIG. 3 is a cross-sectional side view of the device of FIG. 1 and a cross-sectional side view of a food can, as the device is prepared to install on the can;

FIG. 4 is a cross-sectional side view, of the device of FIG. 1 and a cross-sectional side view of a food can with the device installed on the can prior to pressing;

FIG. 5 is a cross-sectional side view of the device of FIG. 1 and a cross-sectional side view of a food can with the device in an advanced step of pressing; and FIG. 6 is a cross-sectional side view of the device of FIG. 1 and a cross-sectional side view of a food can subsequent to the pressing step, showing the can's severed lid held to the device by the suction cup.

DETAILED DESCRIPTION OF THE INVENTION

In the following detailed description, certain specific terminology will be employed for the sake of clarity and a particular embodiment described in accordance with the requirements of 35 USC 112, but it is to be understood that the same is not intended to be limiting and should not be so construed in as much as the invention is capable of taking many forms, and variations in the shape, size and arrangement of parts may be resorted to without departing from the spirit of my invention or the scope of the appended claims.

FIG. 1 shows an isometric top view of the device 10 having a prorated through hole opening 12 located on flexible center section 14. It can be understood that any number of through hole openings 12, within the flexible center section 14, can be used to obtain the desired draining effect and are encompassed in this invention.

FIG. 2 shows an isometric cut-away top view illustrating the device 10 attached to a can 32, having a severed lid 34. The severed lid 34 has an inner, somewhat flat surface area but an outer area adjacent the edge is ribbed for stiffness. According to the present invention, the lid 34 is not initially removed after cutting but as will be apparent hereinafter, it is used as a pressing plate during pressing operations. It is an improvement that the device 10 has a band 18 oblique to the center section 14 which is sized to encompasses the outside perimeter of the can 32, holding the device 10 in place by a friction fit thereby sealing off the contents of the can from the user. A perforated through hole opening 12 is located on the flexible center section 14, of the device 10, so that liquids can be drained from the solid foods and directed away from the user's body and or clothes, as shown in FIG. 5.

FIG. 3 is a cross-sectional side view illustrating the deuce 10, and a can 32 having a severed lid 34 prior to the device 10 being installed onto the can 32. This view also illustrates the oblique band 18, which encompasses the central portion of the device 10, and a suction cup 16 centrally located on the underside of the device 10.

FIG. 4 is a cross-sectional side view illustrating the fit of the device 10 onto a can 32. Without the use of a pressing device, the most desired method for removing liquid from solid food in cans is as follow's. The can is upright when the lid is severed and the lid is allowed to remain in the can. It is then usually desirable to grasp the can and press the lid down with enough pressure to support the lid in place while inverting the can, thus draining off excess liquid from the can. In this manner excess liquid is forcibly squeezed out indiscriminately allowing the liquid to come into contact with the user and the user's clothing. The can is then restored to its original upright position, and the severed lid is removed manually using the fingers exposing the user to risk of cuts and injury by the potential of the severed lid coming into direct contact with the user's fingers.

The invention will be better-understood and additional objects and advantages will become apparent from the following description of the best mode of carrying out the invention taken in conjunction with the accompanying drawings.

In the operation of removing liquid from solid food in cans using the embodiment of this invention as illustrated in FIGS. 1–6, the lid 34 of the can 32 is first severed around its edge and is not removed from the can as it will be used during the pressing operation to assist in the removing of the liquids, namely, as shown in FIG. 3.

Thereupon, the device 10 is placed on the can 32 in its upright position as shown in FIG. 4. The oblique band 18 is sized to encompasses the outside perimeter of the can 32 and holds the device in place by a friction fit thereby sealing off the contents of the can from the user. Then the assembly is inverted as shown in FIG. 5. A pressing function is obtained with the hand applying pressure to the flexible center section 14 of the device 10 as shown in FIG. 5. The liquid is forcibly extracted out around the edge of the severed lid 34. Due to the friction fit of the device 10 onto the outer edge of the can 32 by way of the oblique band 18 the liquid is contained within the device 10 and the user has complete control while the liquid is channeled out the perforated through hole opening 12 of the device 10 thereby eliminating the possibility of the liquid coming into contact with the user's body or clothes. This operation is done with the assembly over a sink or another desired receptacle to catch the fluid. The pressure exerted during the pressing operation serves to flatten the suction cup 16 located on the flexible center portion 14 of the underside of the device 10 thereby creating a vacuum that attaches the severed lid 34 to the suction cup 16

When pressing is completed, the can 32 with the device 10 still assembled is restored to its original upright position The device 10 is then removed from the can 32 as illustrated in FIG. 6. Since the severed lid 34 is attached to the suction cup 16 on the underside of the device 10, the severed lid 34 is removed safely and easily, eliminating any risk of injury and direct contact by the user.

This device 10 is distinct from other prior art inventions. Some prior art describes devices, which fit inside the can and perform the pressing function from that interior position. Berg's device claims a body with an imperforate wall. This is opposite of our design as the central section 14 of our device 10 is perforated with a through hole 12. Berg claims an unfixed device in relation to a can, whereby the can and device make equal and opposite movements telescoping and reverse telescoping. Again this is opposite to our design as the outer retaining band 18 of the device 10 is sized to encompass the outside of the tuna can 32 and holds the press in place by a friction fit. The positioning on the outside edge of the can with a friction fit provides for the liquid being contained within the pressing device 10 and the user having complete control while the liquid is channeled out the opening 12 thereby eliminating the possibility of the canned liquid coming into contact with the user's body or clothes.

It is an advantage of the device 10 that it is manufactured as a molded, single piece and may be comprised of any one of a variety of inexpensive flexible materials including polymer, rubber, and the like or material mixtures known to those skilled in the art. Preferred materials are inert in the sense of unreactive with the food product, so that no off-flavors or colors are imparted to the food during the draining procedure. Rubber or plastic is used in most embodiments because it is inexpensive, inert, and light in weight.

It should be understood that other embodiments of this invention might be manufactured using alternative processes and/or multi-piece designs.

As illustrated, device 10 is in the shape of a circle that fits onto the food can to be drained (as illustrated), but any other shape is encompassed by this invention, such as rectangles for sardine cans and the like (not illustrated).

Another advantage of the device as made and used according to the invention are, in most embodiments, so inexpensive, inert, and light that they can be used as described in FIGS. 1–6 and then disposed of.

What is claimed is:

1. A pressing device for compressing a severed lid into a can and against internal liquid and foodstuff thereby forcibly evacuating the liquid away from the foodstuff without user contamination, said device comprising:

a flexible central section, said flexible central section having pliant capabilities, said flexible central section having a perforated through hole opening, an outer retaining band sized to encompass a can using a friction fit, said outer retaining band oblique to the flexible center section.

2. A device according to claim 1 comprising of multiple openings.

3. A device according to claim 1 whereby a suction cup is centrally located on the underside of the device.

4. A pressing device for draining liquid from canned food installed onto a can that has a top and a bottom and contains a solid foodstuff and packing fluid, comprising a substantially external, structure having outside dimensions sized to encompass the exterior edge of the can whereby the pressing device is held in place on the can using a friction fit and having a flexible central section and perforated through hole drain so that, when the pressing device is installed onto the can and actuated, packing fluid is extracted from the solid food.

5. A device according to claim 4 comprising of multiple openings.

6. A device according to claim 4 whereby a suction cup is centrally located on the underside of the device.

* * * * *